June 5, 1934.

J. X. PHILLIPS, JR

Re. 19,202

WINDSHIELD CLEANER

Original Filed June 30, 1923 3 Sheets-Sheet 1

Inventor
John X. Phillips, Jr.

By Beau & Brooks.
Attorneys

June 5, 1934. J. X. PHILLIPS, JR Re. 19,202

WINDSHIELD CLEANER

Original Filed June 30, 1923 3 Sheets-Sheet 2

Inventor
John X. Phillips, Jr.

By

Beau & Brooks. Attorneys

June 5, 1934. J. X. PHILLIPS, JR Re. 19,202

WINDSHIELD CLEANER

Original Filed June 30, 1923 3 Sheets-Sheet 3

Inventor
John X. Phillips, Jr.

By

Beau & Brooks, Attorneys

Reissued June 5, 1934 Re. 19,202

UNITED STATES PATENT OFFICE 19,202

WINDSHIELD CLEANER

John X. Phillips, Jr., Washington, D. C., assignor, by mesne assignments, to Trico Products Corporation, Buffalo, N. Y., a corporation of New York Original application June 30, 1923, Serial No. 648,818, Patent No. 1,666,107, dated April 17, 1928. Divided and application August 5, 1925, Serial No. 48,419, Patent No. 1,693,665, dated December 4, 1928. Application for reissue August 28, 1933, Serial No. 687,232

22 Claims. (Cl. 15—255)

This invention relates to improvements in windshield cleaners and is a division of Patent No. 1,666,107 granted to me April 17, 1928.

In the above mentioned patent, of which this application is a division, I have described and claimed a motor for operating windshield cleaners wherein a suction casing is provided having a movable member therein, means being provided for alternately connecting said casing on opposite sides of said movable member with a source of differential pressure by means of a valve mechanism controlled by movement of the movable member. The valve mechanism is arranged to operate at each normal limit of movement of the movable member to reverse the direction of travel thereof, and means are provided for rendering the valve mechanism ineffective whereby the movable member may partake of movement beyond its normal limit to remove the cleaner arm from the line of vision of the driver of an automobile. In the above mentioned patent I also describe a windshield cleaner adapted to be actuated by the motor above mentioned, the cleaner being movable through a predetermined stroke by the movable member referred to, the cleaner arm being adapted to swing beyond its normal limit of movement to assume a substantially horizontal position out of the line of the driver's vision. Movement of the cleaner arm beyond its normal limit is utilized for moving the cleaner arm outwardly whereby the wiper will be disengaged from the windshield glass to relieve tension on the rubber wiper thus preventing distortion of the rubber when not in use. The windshield cleaner referred to forms the subject matter of the present invention.

An object of the invention is to provide a windshield cleaner having a cleaner arm adapted to be moved to a horizontal position out of contact with the windshield when the device is not in operation.

A still further object is to provide a cleaner arm adapted to be pivotally connected to an oscillating motor shaft provided with means for moving the windshield wiper out of contact with the windshield glass as the cleaner arm approaches a horizontal position.

More specifically the invention comprises a cleaner motor embodying a shaft adapted to oscillate through a predetermined arcuate movement of preferably less than 180°, and a cleaner arm pivotally connected to the shaft and provided with a wiper blade adapted to contact with the windshield glass during normal operation of the motor shaft. When the device is not in operation the cleaner arm is adapted to be moved to a substantially horizontal position beyond either normal limit of its stroke, and in its movement beyond its normal limit, the arm is adapted to be moved away from the windshield by a novel cam action.

Figure 1:
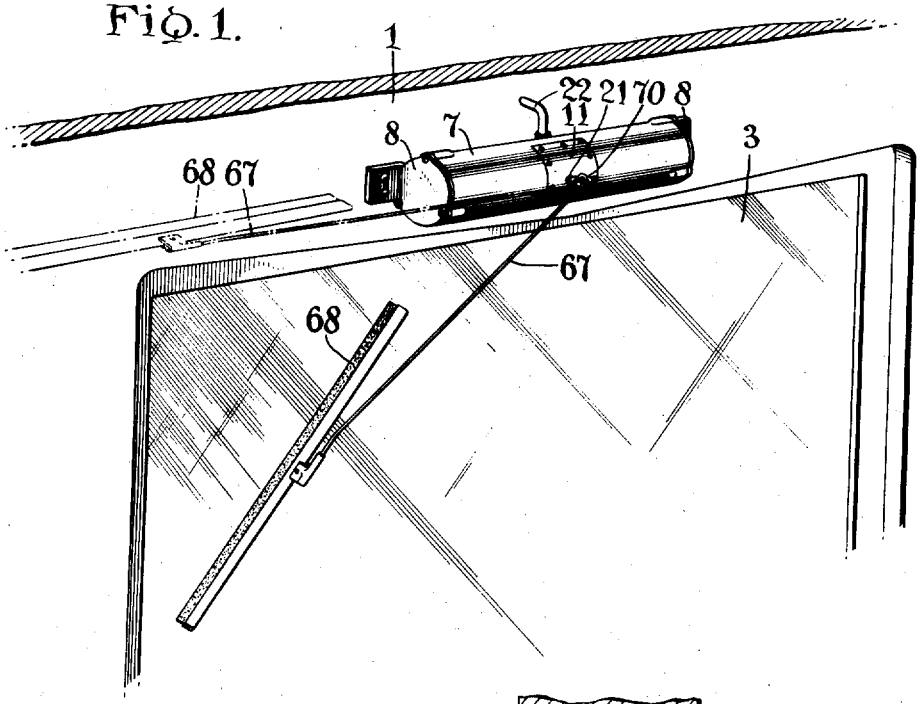
Figure 2:
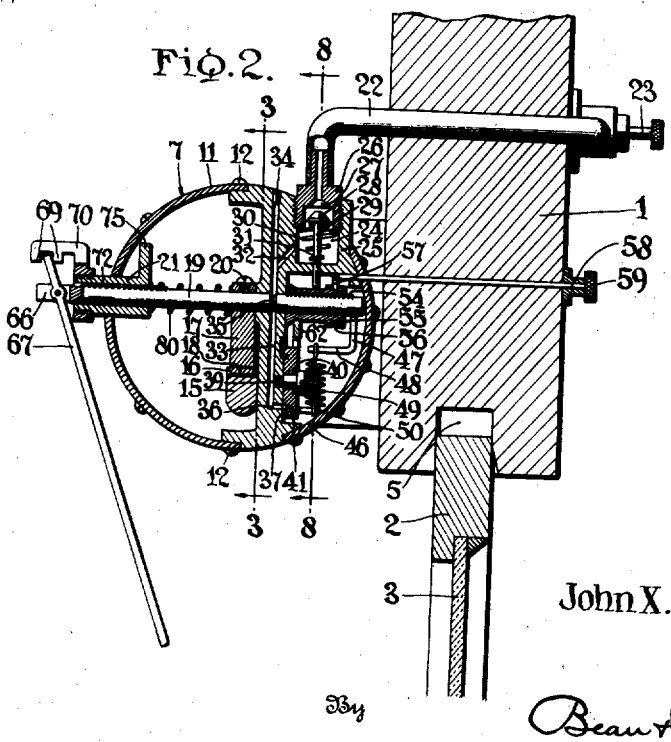
Figure 3:
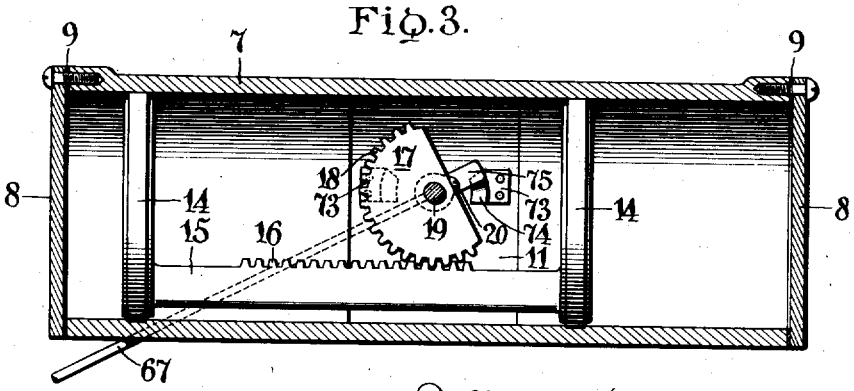

In the accompanying drawings, I have shown one embodiment of the invention. In this showing:

Fig. 1 is a perspective view of a window, such as a trolley car window, showing the invention applied, Fig. 2 is a central vertical sectional view, Fig. 3 is a vertical longitudinal sectional view through the motor casing on line 3—3 of Fig. 2.

Figure 4:
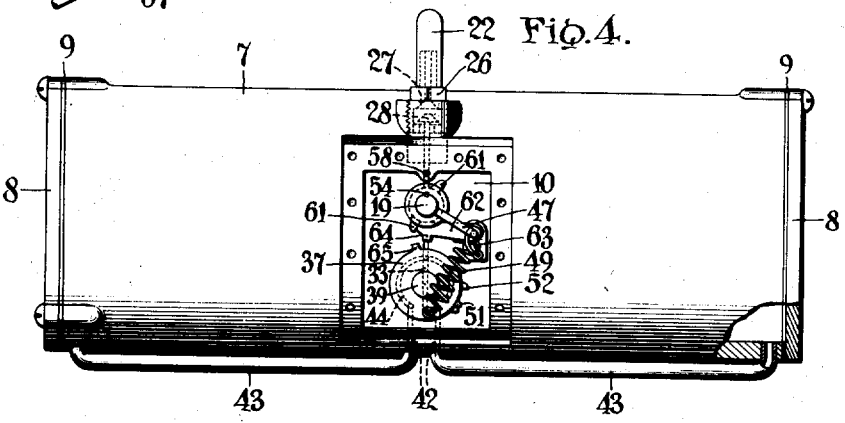
Figure 5:
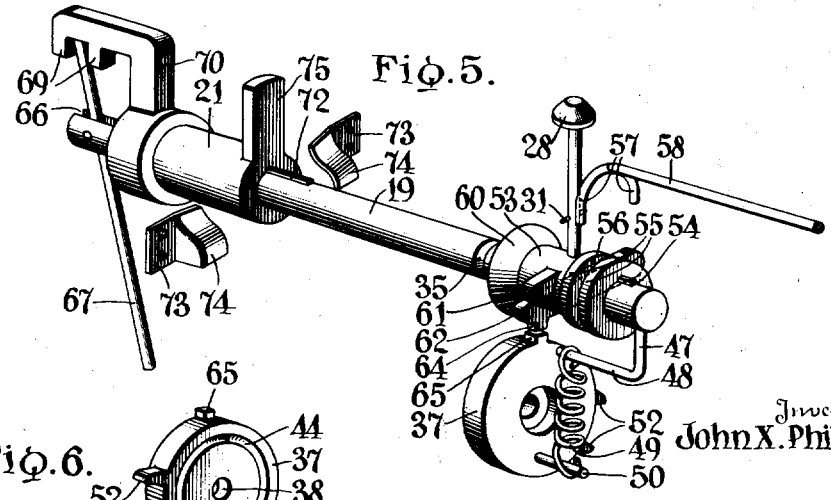
Figure 6:
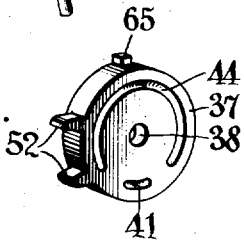
Figure 7:
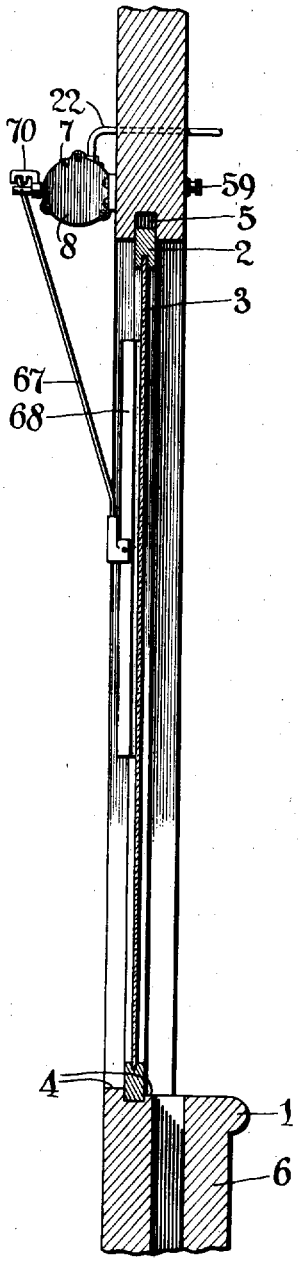
Figure 8:
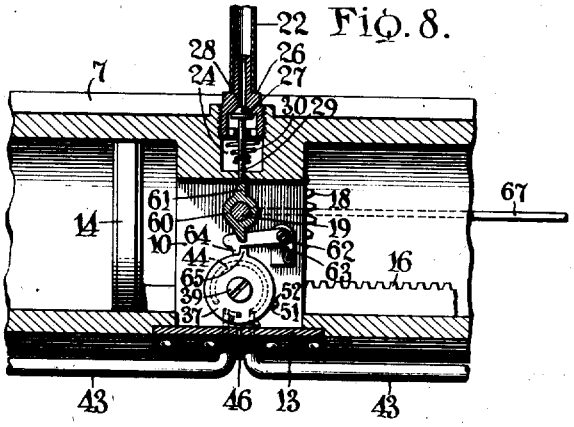
Figure 9:
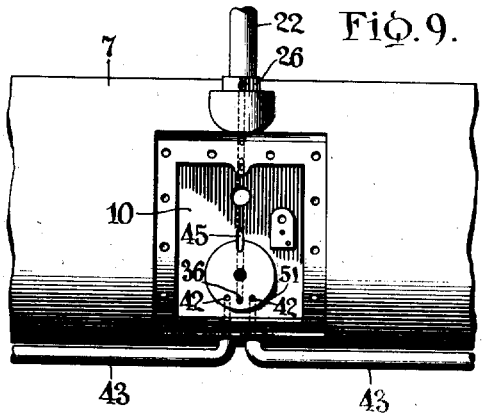
Figure 10:
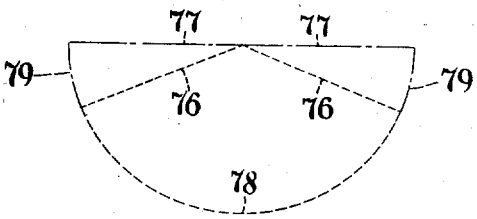
Figure 11:
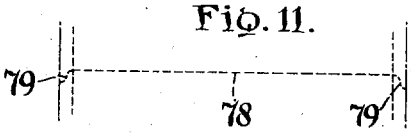

Fig. 4 is a rear elevation of the motor casing or cylinder with the cover plate over the valve mechanism removed, Fig. 5 is a detail perspective view of the cleaner shaft and associated parts, whereby the main valve is locked in closed position and the snap-over mechanism rendered inoperative, Fig. 6 is a detail perspective view of the automatically operated valve showing the side of the valve as shown in Fig. 5, Fig. 7 is a sectional view of the window casing and sash, showing the cleaner in elevation, Fig. 8 is a sectional view on line 8—8 of Fig. 2, Fig. 9 is a view similar to Fig. 4 with the valve and operating mechanism removed, Fig. 10 is a diagrammatic front elevation of the path of movement of the cleaner arm, and, Fig. 11 is a plan view thereof.

Referring to the drawings, the reference numeral 1 designates a portion of the front of a trolley car or similar vehicle. A window frame 2 is arranged therein and is provided with a pane 3 of glass or other transparent material. As shown, the bottom of the window frame is provided with a pair of spaced ribs 4 forming a groove for the reception of the bottom of the sash. A pocket 5 is formed at the top to receive the top of the window sash. The vehicle body is provided with a pocket 6 of the usual construction into which the window is adapted to be lowered when desired.

The cleaner comprises a cylinder or casing 7 mounted on the body of the car above the window sash, as shown in Figs. 1 and 6 of the drawings. The ends of the cylinder are closed by heads 8 having suitable packing 9 arranged therein. A web or plate 10 is arranged substantially centrally of the cylinder and forms a support for the valves and valve actuating mechanism. The cylinder is cut away adjacent this plate and the front of the cylinder is closed by a cover plate 11 secured to the web 10, by means of screws 12. The rear side is closed by a somewhat similar plate 13 of smaller size and the space between the plate 13 and the web 10 forms the valve chamber. A piston 14 is mounted in each end of the cylinder and these pistons are provided with suitable packing in the usual manner. Each piston is adapted to move in the space between the web 10 and the end of the cylinder. These pistons are connected by a longitudinal web 15 having rack teeth 16 formed on its upper face. A segmental gear 17 having teeth 18 is mounted on a cleaner shaft 19 and meshes with rack teeth 16 to drive the cleaner shaft. As shown, the gear is secured to the shaft by means of a set screw 20. The shaft is journaled in the web 10 and the outer end of the shaft is received in a sleeve 21 carried by the cover plate. As shown in Fig. 2 of the drawings, the segmental gear 19 is arranged adjacent the web 10, and the longitudinal web 15 is arranged beneath the segmental gear on one side of the web 10.

A feed pipe 22 extends to a suitable source of pressure or suction (not shown) and is provided with a control valve 23 arranged therein. This pipe is connected to an inlet chamber 24 formed in an enlargement 25 on the upper portion of the plate 10. As shown, a plug 26 is screw-threaded into the upper end of the chamber 24 and receives the end of the pipe 22. This plug is provided with a valve seat 27 adapted to receive a valve 28. The valve is provided with a stem 29 extending through an opening in the bottom of the chamber 24 and the valve is normally retained in open position by means of a spring 30, surrounding the stem and engaging a pin 31 carried thereby. The chamber 24 is provided with an outlet port 32, communicating with a main feed passage 33, extending substantially the full length of the plate 10. As shown, the upper end of this passage is closed by a plug 34. The shaft 19 is provided with a groove 35 in alinement with the feed passage 33 to permit air or other fluid to pass around it. The bottom of the passage 33 communicates with a port 36 extending through one side of the plate 10. A disk valve 37 is arranged on the face of the plate 10 over the inlet port 36. As shown, the valve is provided with a central opening 38 adapted to receive a pin 39 which retains it in position and permits it to oscillate. A spring 40 is arranged around the pin to retain the valve on its seat. This valve is provided with a groove 41 in its face, adapted to connect the passage 36 with either of a pair of passages 42 extending through the plate 10 and connected to suitable conduits 43 leading to opposite ends of the cylinder. The valve is likewise provided with another groove 44 of greater length and adapted to connect either of the passages 42 to an exhaust passage 45 opening into the valve chamber. The cover plate 13 may be provided with a vent opening 46.

An arm 47 is connected to the end of the shaft 19 and extends downwardly therefrom. The arm is provided with an offset end 48 adapted to receive one end of a coil spring 49. The other end of the spring is connected to a pin 50 carried by the valve 37, and this spring is adapted to move the valve from one position to another as the shaft oscillates. A pin 51 is mounted on the face of the plate 10 and the valve is provided with a pair of projections 52, adapted to engage this pin to limit the movement of the valve.

A sleeve 53 is mounted on the shaft 19 within the valve chamber. As shown, the sleeve is connected to the shaft by means of a key 54, permitting longitudinal movement of the sleeve but preventing relative rotary movement. One end of the sleeve is provided with a pair of spaced collars 55 forming a groove 56. A yoke 57 is mounted in this groove and a rod 58 is connected to the yoke. This rod passes through the frame of the car and is provided with a handle 59 by means of which the rod may be moved to move the sleeve longitudinally of the shaft. The other end of the sleeve is provided with a cam 60 forming a part of the control mechanism for the automatic valve 37. Adjacent the cam, the sleeve is provided with a pair of projections 61 spaced from each other substantially 180 degrees. A latch 62 is pivotally mounted on the plate 10 above the disk valve 37. This latch is normally retained in a raised position by means of a spring 63. The latch is provided with a depending tooth 64 adapted to cooperate with a projecting lug 65 carried by the disk valve to lock the valve when the latch is in lowered position. When the sleeve 53 is moved longitudinally of the shaft, a cam 60 immediately lowers the latch 62, lowering the tooth 64 into the path of the lug 65, and preventing the valve 37 from shifting. At the same time, the projections 61 are brought into vertical alinement with the valve stem 29 and upon oscillation of the shaft, the valve stem is raised to close the valve 28.

The outer end of the shaft 19 is forked, as indicated at 66, and is adapted to pivotally support a cleaner arm 67. This cleaner arm is provided with the usual cleaner element 68 adapted to contact with the glass 3 when in operative position. The cleaner arm extends beyond the pivot and the upper end is received between a pair of spaced members 69 carried by an arm or bracket 70 mounted on the sleeve 21. This sleeve is keyed to the shaft to oscillate therewith by means of a key 72. A plate 73 is secured to the inside of the cover plate 11 on each side of the shaft and each of these plates is provided with a cam portion 74. The sleeve 21 is provided with an arm 75 adapted to ride over these cam portions to move the sleeve inwardly when the shaft is oscillated a predetermined distance in either direction.

In the diagrammatic illustration shown in Figs. 10 and 11 of the drawings, the normal path of the cleaner arm in operation is designated by the lines 76. When the cleaner arm oscillates through the arc designated by the line 76, the arm 75 does not engage either of the cams 74 and the cleaner element is maintained in contact with the window to be cleaned. The horizontal lines 77 indicate the limit of movement of the cleaner arm when the motor is shut off and the cleaner arm moves to the inoperative position shown in dotted lines in Fig. 1 of the drawings. When the cleaner arm moves through the arc designated by the lines 76 and 77 at either side of the semicircle shown in Fig. 10 of the drawings, the arm 75 engages one of the cams 74 to move the sleeve 21 inwardly and thus swing the cleaner arm on its pivot. As the upper end of the cleaner arm is moved inwardly, the lower end, carrying the cleaner element, is moved outwardly away from the window. In Fig. 11 of the drawings, the position of the cleaner element in normal operation is indicated by the dotted line 78 and the upward movement of the cleaner element away from the window is indicated by the dotted lines 79.

In operation, the casing is connected to a source of suction or pressure by opening the valve 23. Fluid is admitted or withdrawn from the fluid chamber 24 which is connected to the opposite ends of the casing by means of the automatic valve 37. With the valve in the position shown in Fig. 4 of the drawings, the right hand end of the casing is connected to the source of power by means of its conduit 43, passage 42, the passage 41 in the disk valve, and passages 33 and 36 in the plate 10. In a pressure operated motor, the pistons will then be moved toward the left, oscillating the shaft 19 in a clockwise direction in this figure. The arm 47 moves with the shaft, causing the upper end of the spring to move toward the opposite side of the plate 10. When the spring passes a center point and is again placed under tension, the valve 37 will be moved in a clockwise direction to place the opposite side of the cylinder in communication with the source of power. The movement of the valve is limited by the stops 52 and the pin 51 so that the groove 41 in the face of the valve will always bridge the space between the passage 36 and one of the passages 42. If the cleaner is to be operated by suction, the connection of the end of the cylinder to the source of suction will move the pistons in a reverse direction as will be apparent, and it is therefore necessary to reverse the position of the valve. When either end of the cylinder is in communication with the source of power, the opposite end is in communication with the atmosphere through the port 42, port 44 of the valve 37 and the exhaust port 43.

Heretofore in operating windshield cleaners by fluid pressure motors, it has been customary to close the valve corresponding to the valve 23 when the cleaner is to be shut off. The fluid in the conduits corresponding to the conduit 22, then passes into the motor casing and the cleaner element stops at any position in its stroke, frequently in a position midway of a stroke, thus interfering with the vision of the operator of the vehicle. To cut off the motor in the present device, the rod 58 is pulled outwardly, moving the sleeve 53 outwardly on the shaft 19. This brings the projections 61 into alinement with the valve stem 29 and as the shaft is oscillated, one of the projections 61 engages the valve stem, forcing it upwardly and closing the valve 28. At the same time, the cam 60 lowers the latch 62 into the path of the lug 65 and locks the automatic valve against operation. As the automatic valve 37 is then locked against rotation, the supply of fluid from one end of the cylinder to the other will not shift when the cleaner arm reaches the normal end of its stroke, indicated by the dotted lines 76 in Fig. 10 of the drawings. The cleaner arm will then continue to move upwardly to the position shown in dotted lines in Fig. 1 of the drawings, and indicated by the dotted line in Fig. 10 of the drawings. As the cleaner arm moves through the arc indicated by the dotted lines 76 and 77 the arm 75 engages the cam 74 to swing the cleaner element outwardly away from the window, as previously described and as indicated by the dotted line 79 in Fig. 11 of the drawings. This outward movement of the cleaner permits it to ride over the frame 1 of the vehicle body and further permits the window to be lowered without danger of the cleaner element being struck by the upper sash 2.

It is necessary in constructing the motor casing to provide a casing slightly longer than the normal movement of the pistons 14, to allow for the additional movement of the pistons toward either end of the cylinder when the supply of fluid is cut off and the cleaner is moved to its inoperative position. The cleaner is then in position for further operation by returning the sleeve 53 to its normal position. When the arm 75 disengages the cam 74 upon reopening the valve 23, the sleeve 21 is moved to its normal position by means of a spring 80 arranged on the shaft 19 and engaging the sleeve at one end. The opposite end of the spring engages the segmental gear 17 and is compressed when the sleeve is moved inwardly by the cam.

It is to be understood that the form of my invention herewith shown and described is to be taken as a preferred example of the same and that various changes in the shape, size, and arrangement of parts may be resorted to without departing from the spirit of the invention or the scope of the subjoined claims.

I claim:

1. In a windshield cleaner, a motor, a cleaner arm connected to said motor to be operated thereby, said motor embodying means for defining a normal stroke to said cleaner arm short of the full extent of movement to which said motor is capable of moving said arm, means for moving said cleaner arm outwardly from wiping contact with the windshield glass when the motor moves said cleaner arm beyond its normal stroke, and a manually operated means for rendering said first means inoperative whereby the motor may move the cleaner arm beyond its normal stroke.

2. In a windshield cleaner, a motor, a cleaner arm connected to said motor to be normally reciprocated thereby, means adapting the motor for imparting an abnormal stroke to the cleaner arm, a cam arranged adjacent said cleaner arm beyond the normal limit of its reciprocation, and means connected to said cleaner arm and adapted to engage said cam at the end of its abnormal stroke to move said cleaner arm outwardly.

3. A windshield cleaner comprising a motor embodying a movable member, means for intermittently reversing the application of power to said member to effect a predetermined, reciprocatory movement of said member less than its maximum stroke, manually operated means for holding said reversing means against operation whereby the operating power will be continuously applied to said movable member for driving the same beyond the normal path of movement thereof, a cleaner arm operatively connected to said movable member for movement over a defined normal path, said cleaner arm being movable by said movable member beyond its normal path when said reversing means is held against operation, and means coacting with said cleaner arm and movable in part perpendicular to the plane of the normal path of movement thereof, when the latter moves beyond its normal path, for moving said cleaner arm from the plane of said normal path.

4. A windshield cleaner comprising a cleaner arm, an operating shaft carrying the same, means movable along the shaft for moving the cleaner arm outwardly from the windshield glass, means connected to the shaft for rocking the shaft a predetermined extent, and also by which said shaft may be abnormally rocked beyond the predetermined extent, and means for actuating said first means when the shaft is rocked beyond its normal predetermined extent.

5. In a windshield cleaner, a motor including an oscillating shaft, a wiper supporting arm carried by the shaft to be oscillated thereby and pivotally connected adjacent one end to said shaft to be rocked thereon for moving the supported wiper from the windshield, a sleeve slidably mounted on said shaft and having a portion engaging said arm to rock the latter on the shaft when the sleeve is shifted axially, and means adapted to slide said sleeve as said arm reaches an end of its stroke to rock the arm for moving the wiper away from the windshield.

6. A device constructed in accordance with claim 5 wherein said last named means comprises a cam adapted to engage said sleeve.

7. In a windshield cleaner, a motor including an oscillating shaft, a cleaner arm pivotlly connected adjacent its upper end to said shaft to be oscillated thereby, a sleeve slidably mounted on said shaft to oscillate therewith, said sleeve having a portion engaging said arm, a spring normally urging said sleeve in one direction to turn said arm about its pivot, and means adapted to engage said sleeve to move it against the tension of said spring when said arm approaches the limit of its movement in one direction.

8. A device constructed in accordance with claim 7 wherein said means comprises a cam, said sleeve being provided with a portion extending transversely of said shaft and adapted to engage said cam.

9. A windshield cleaner comprising an operating shaft, a cleaner arm pivoted thereto, a sleeve slidable on the shaft and rockable therewith, said sleeve being movable on the shaft and having a part acting to move the wiper arm outwardly from the windshield glass upon movement of said sleeve, a radially extending arm carried by the sleeve, and a cam fixed in the path of movement of said sleeve arm for being engaged thereby for effecting a longitudinal shifting of said sleeve on the shaft.

10. A windshield cleaner comprising a motor embodying a movable member, means for intermittently reversing the application of power to said movable member for defining a normal path of movement therefor short of the full extent of movement thereof, a cleaner element operable over a defined path by said movable member, means for arresting said first means whereby said movable member will be moved beyond its normal path, and means for moving the cleaner element out of its normal plane of operation by and during movement of said movable member beyond its defined path of movement in either direction of movement.

11. A windshield cleaner comprising a motor embodying a movable member, means for intermittently reversing the application of power to said movable member short of the full movement of the latter for defining a normal path of movement therefor, a cleaner element operable over a defined path by said movable member and movably connected therewith, means for arresting said first means whereby the power will continue to be applied to said movable member uni-directional to move the latter beyond its normal path, means for shutting off the application of power to said movable member after the latter has moved beyond its normal path of movement, and means operable subsequent to and by and during the movement of said movable member beyond its normal path of movement for moving said cleaner element out of its normal plane of movement.

12. A windshield cleaner comprising a motor embodying a movable member, means for intermittently reversing the application of power to said movable member for defining a normal path of movement therefor short of the full extent of movement thereof, a cleaner element operable over a defined path by said movable member, means for arresting said reversing means whereby said movable member will be moved beyond its normal path, means for moving the cleaner element out of its normal plane of operation by and during movement of said movable member beyond its normal path of movement, and means for successively rendering said arresting means operative and cutting off the application of power to said movable member.

13. A windshield cleaner consisting of a casing, a piston therein, one of the aforesaid elements being reciprocable, automatic valve mechanism for operatively admitting fluid pressure to the casing at the end of each normal stroke of said reciprocable element, the latter being movable beyond the normal limits of its travel, a wiper movable back and forth over a windshield by said reciprocable element; means for arresting the operation of the valve mechanism when said reciprocable element reaches one normal limit of movement so that the fluid pressure will continue to impel said reciprocable element beyond said specified normal limit, and means functioning by and during movement of said reciprocable member beyond its normal path of movement for relieving the wiping contact of the wiper on the windshield.

14. A windshield cleaner consisting of a casing, a piston therein, one of the aforesaid elements being reciprocable, automatic valve mechanism for operatively admitting fluid pressure to the casing at the end of each stroke of said reciprocable element, a wiper movable back and forth over a windshield by said reciprocable element; means for rendering the valve mechanism inoperative at the end of a stroke of said reciprocable element whereby fluid pressure will continue to urge said reciprocable element against a return movement, and means for moving the wiper from off the windshield glass when said valve mechanism is rendered inoperative, said last means acting in cooperation with the continued application of fluid pressure after said valve mechanism has been rendered inoperative.

15. A windshield cleaner comprising a motor embodying a movable member, means for intermittently reversing the application of power to said movable member for defining a normal path of movement therefor short of the full extent of movement thereof, a cleaner element operable over a defined path by said movable member and movable thereby beyond said defined path when said movable member moves beyond its normal limits of movement, and means for arresting said first means whereby the power will be applied to said movable member unidirectionally for moving the latter and said cleaner element beyond their respective normal limits of movement for parking said cleaner element without the area of the windshield that is cleaned by said cleaner element during the normal operation thereof.

16. A windshield cleaner consisting of a casing, a piston therein, one of the aforesaid elements being reciprocable, automatic valve mechanism having a valve part movable from one to the other of two operative positions for operatively admitting fluid pressure to the casing for reciprocating said reciprocable element over a normal path of movement, said reciprocable element being adapted to move beyond the limits of said normal path of movement by the continuous application of fluid pressure in one direction only, a wiper movable back and forth over a definite area of a windshield by said reciprocable element and adapted to be moved by the latter out of such definite area when said reciprocable element is moved beyond its limits of normal path of movement, and means for locking said valve part in either of its two positions whereby the fluid pressure will continue to impel said reciprocable element beyond the limits of its normal path of movement.

17. A windshield cleaner comprising a wiper, a fluid pressure motor having a part movable to operate the wiper, said motor embodying automatic valve mechanism for reversing the application of power to said part for moving the wiper back and forth, a manually controlled device for arresting said automatic valve mechanism against actuation whereby the fluid pressure will act upon said part to park the wiper at one side of the windshield area cleaned thereby, and means for shutting off the fluid pressure as the wiper is parked.

18. A windshield cleaner comprising a wiper, a fluid pressure motor having a part movable to operate the wiper, said motor embodying automatic valve mechanism for reversing the application of power to said part for moving the wiper back and forth, and a manually controlled device for arresting said automatic valve mechanism against actuation whereby the fluid pressure will act upon said part to park the wiper at one side of the windshield area cleaned thereby.

19. A windshield cleaner comprising a wiper, a fluid pressure motor having a part movable to operate the wiper, said motor embodying automatic valve mechanism for reversing the application of power to said part for moving the wiper back and forth, a device for arresting said automatic valve mechanism against reversing whereby the fluid pressure will act upon said part to park the wiper at one side of the windshield area cleaned thereby, and manual preset means for rendering said device operative.

20. A windshield cleaner comprising a motor embodying a movable member, a power shut off for the motor, means for intermittently reversing the application of power to said member for defining a normal path short of the full extent of movement thereof, a cleaner element operable back and forth by said movable member and movable thereby to a parked position beyond its normal path, means for arresting said first means to park the cleaner element without the area cleaned by said cleaner element, and means for operating said power shut off to interrupt the power supply to the motor at the time of parking, said last means being connected to said arresting means for substantially concurrent operation.

21. A windshield cleaner comprising a motor embodying a movable member, means for intermittently reversing the application of power to said movable member for defining a normal path of movement therefor short of the full extent of movement thereof, a cleaner element operable over a defined path by said movable member and movable thereby beyond said defined path when said movable member moves beyond its normal limits of movement, means for arresting said first means whereby the power will be applied to said movable member uni-directionally for moving the latter and said cleaner element beyond their respective normal limits of movement for parking said cleaner element, and means for automatically shutting off the power to said motor by and during the parking operation.

22. A windshield cleaner comprising a motor embodying a movable member, means for intermittently reversing the application of power to said movable member for defining a normal path of movement thereof short of the full extent of movement thereof, a cleaner element operable over a defined path by said movable member and movable thereby beyond said defined path when said movable member moves beyond its normal limits of movement, means for arresting said first means whereby the power will be applied to said movable member uni-directionally for moving the latter and said cleaner element beyond their respective normal limits of movement for parking said cleaner element, means for automatically shutting off the power to said motor by and during the parking operation, and manually pre-set means for rendering said arresting means operative.

JOHN X. PHILLIPS, JR.